(12) United States Patent
Zhang et al.

(10) Patent No.: US 11,974,199 B2
(45) Date of Patent: Apr. 30, 2024

(54) METHODS AND APPARATUSES FOR COMMUNICATION BETWEEN LWM2M CLIENT AND SERVER

(71) Applicant: Telefonaktiebolaget LM Ericsson (PUBL), Stockholm (SE)

(72) Inventors: Fengpei Zhang, Guangzhou (CN); Yun Zhang, Guangzhou (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 380 days.

(21) Appl. No.: 17/599,248

(22) PCT Filed: Mar. 3, 2020

(86) PCT No.: PCT/CN2020/077610
§ 371 (c)(1),
(2) Date: Sep. 28, 2021

(87) PCT Pub. No.: WO2020/199827
PCT Pub. Date: Oct. 8, 2020

(65) Prior Publication Data
US 2022/0182799 A1 Jun. 9, 2022

(30) Foreign Application Priority Data
Apr. 4, 2019 (WO) ................ PCT/CN2019/081502

(51) Int. Cl.
*H04W 4/14* (2009.01)
*H04L 41/0806* (2022.01)
*H04W 4/70* (2018.01)

(52) U.S. Cl.
CPC ........... *H04W 4/14* (2013.01); *H04L 41/0806* (2013.01); *H04W 4/70* (2018.02)

(58) Field of Classification Search
CPC ........ H04L 41/0806; H04W 4/14; H04W 4/70
See application file for complete search history.

(56) References Cited

U.S. PATENT DOCUMENTS

2016/0234181 A1* 8/2016 Bone ....................... H04W 8/04
2018/0324671 A1 11/2018 Palnati et al.
2019/0306251 A1* 10/2019 Talebi Fard .......... H04W 76/10

FOREIGN PATENT DOCUMENTS

WO 2018 069259 A1 4/2018

OTHER PUBLICATIONS

3GPP TS 23.682 v15.6.0; Technical Specification; 3rd Generation Partnership Project; Technical Specification Group Services and System Aspects; Architecture enhancements to facilitate communications with packet data networks and applications (Release 15)—Sep. 2018.

(Continued)

*Primary Examiner* — Mansour Oveissi
(74) *Attorney, Agent, or Firm* — Weisberg I.P. Law, P.A.

(57) ABSTRACT

Methods and apparatuses for communication between lightweight machine to machine (LwM2M) client and server are disclosed. According to an embodiment, a network exposure node performs configuration such that the network exposure node can transfer traffic between a LwM2M client and at least one LwM2M server over non-Internet protocol data delivery (NIDD) through reliable data service (RDS) protocol. The network exposure node transfers traffic between the LwM2M client and the at least one LwM2M server based on the configuration.

19 Claims, 14 Drawing Sheets

(56) References Cited

OTHER PUBLICATIONS

3GPP TS 23.682 v16.2.0; Technical Specification; 3rd Generation Partnership Project; Technical Specification Group Services and System Aspects; Architecture enhancements to facilitate communications with packet data networks and applications (Release 16)—Mar. 2019.
3GPP TS 24.250 v15.0.0; Technical Specification; 3rd Generation Partnership Project; Technical Specification Group Core Network and Terminals; Protocol for Reliable Data Service between UE and SCEF; Stage 3 (Releae 15)—Dec. 2017.
3GPP TS 29.122 v15.1.0; Technical Specification; 3rd Generation Partnership Project; Technical Specification Group Core Network and Terminals; T8 reference point for Northbound APIs (Release 15)—Sep. 2018.
PCT Notification of Transmittal of the International Search Report and the Written Opinion of the International Searcihng Authority, or the Declaration issued for International application No. PCT/CN2020/077610—May 27, 2020.
Lightweight Machine To Machine Technical Specification: Core, Candidate Version 1.1 by OmaSpecWorks—Jun. 12, 2018.
Lightweight Machine To Machine Technical Specification: Transport Bindings, Candidate Version 1.1 by omaSpecWorks—Jun. 12, 2018.

\* cited by examiner

METHODS AND APPARATUSES FOR COMMUNICATION BETWEEN LWM2M CLIENT AND SERVER

PRIORITY

This nonprovisional application is a U.S. National Stage Filing under 35 U.S.C. § 371 of International Patent Application Serial No. PCT/CN2020/077610 filed Mar. 3, 2020 and entitled "METHODS AND APPARATUSES FOR COMMUNICATION BETWEEN LWM2M CLIENT AND SERVER" which claims priority to International Patent Application Serial No. PCT/CN2019/081502 filed Apr. 4, 2019 both of which are hereby incorporated by reference in their entirety.

TECHNICAL FIELD

Embodiments of the disclosure generally relate to communication, and, more particularly, to methods and apparatuses for communication between lightweight machine to machine (LwM2M) client and server.

BACKGROUND

This section introduces aspects that may facilitate better understanding of the present disclosure. Accordingly, the statements of this section are to be read in this light and are not to be understood as admissions about what is in the prior art or what is not in the prior art.

Lightweight machine to machine (LwM2M) version 1.0 supports short message service (SMS) and user datagram protocol (UDP) transport bindings. They can be used to support multiple LwM2M servers (including bootstrap server). As shown in FIG. 1, for Internet protocol (IP) based binding (e.g. UDP/transmission control protocol (TCP) binding), uniform resource identifier (URI)/uniform resource locator (URL) is used to access multiple LwM2M servers. In 'LwM2M Security' object, there is one item called 'LwM2M Server URI' to define the URI/URL of LwM2M servers respectively. As shown in FIG. 2, for SMS binding, SMS short code is used to access multiple LwM2M servers. In 'LwM2M Security' object, there is one item called 'LwM2M Server SMS Number' to define the SMS short code of LwM2M servers respectively.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for communication between LwM2M client and server.

According to a first aspect of the disclosure, there is provided a method in a network exposure node. The method comprises performing configuration such that the network exposure node can transfer traffic between a LwM2M client and at least one LwM2M server over non-IP data delivery (NIDD) through reliable data service (RDS) protocol. The method comprises transferring traffic between the LwM2M client and the at least one LwM2M server based on the configuration.

In this way, at least one LwM2M server (especially multiple LwM2M servers) can be supported for LwM2M over NIDD binding.

In an embodiment of the disclosure, the configuration may cause: at least one RDS port of the network exposure node each of which corresponds to one of the at least one LwM2M server; and at least one RDS port of the LwM2M client each of which corresponds to one or more of the at least one LwM2M server.

In an embodiment of the disclosure, the at least one LwM2M server may comprise a bootstrap server. Both the RDS port of the network exposure node and the RDS port of the LwM2M client which correspond to the bootstrap server may be predefined RDS ports.

In an embodiment of the disclosure, performing the configuration may comprise receiving configuration information for NIDD between the LwM2M client and the LwM2M server. Performing the configuration may further comprise providing, to the LwM2M server, a configuration identifier (ID) for the configuration information.

In an embodiment of the disclosure, the configuration may have the configuration ID and the configuration information. The configuration information may comprise: an ID of the LwM2M client; an ID of the LwM2M server; a RDS port of the network exposure node corresponding to the LwM2M server; a RDS port of the LwM2M client corresponding to the LwM2M server; and a network address of the LwM2M server.

In an embodiment of the disclosure, the at least one LwM2M server may comprise one or more of: a bootstrap server, a device management server and an information reporting server.

In an embodiment of the disclosure, transferring traffic between the LwM2M client and a LwM2M server may comprise receiving, from the LwM2M server, a first message including a payload, the configuration ID corresponding to the LwM2M client, the RDS ports of the network exposure node and the LwM2M client which correspond to the LwM2M server. Transferring traffic between the LwM2M client and a LwM2M server may further comprise determining an ID of the LwM2M client from the configuration information corresponding to the configuration ID. Transferring traffic between the LwM2M client and a LwM2M server may further comprise sending a second message to the LwM2M client based on the ID of the LwM2M client. The second message may include the payload, the RDS ports of the network exposure node and the LwM2M client which correspond to the LwM2M server.

In an embodiment of the disclosure, transferring traffic between the LwM2M client and a LwM2M server may comprise receiving, from the LwM2M client, a third message including a payload, the RDS ports of the LwM2M client and the network exposure node which correspond to the LwM2M server, and an ID of the LwM2M client. Transferring traffic between the LwM2M client and a LwM2M server may further comprise determining a network address of the LwM2M server from the configuration information corresponding to the RDS ports of the LwM2M client and the network exposure node and the ID of the LwM2M client. Transferring traffic between the LwM2M client and a LwM2M server may further comprise sending a fourth message to the LwM2M server based on the network address of the LwM2M server. The fourth message may include the payload, the RDS ports of the LwM2M client and the network exposure node, and the ID of the LwM2M client.

According to a second aspect of the disclosure, there is provided a method in a LwM2M client. The method comprises communicating with at least one LwM2M server over NIDD via a network exposure node through RDS protocol.

In an embodiment of the disclosure, the communication may be performed based on: at least one RDS port of the network exposure node each of which corresponds to one of the at least one LwM2M server; and at least one RDS port of the LwM2M client each of which corresponds to one or more of the at least one LwM2M server.

In an embodiment of the disclosure, the at least one LwM2M server may comprise a bootstrap server. Both the RDS port of the network exposure node and the RDS port of the LwM2M client which correspond to the bootstrap server may be predefined RDS ports.

In an embodiment of the disclosure, the at least one LwM2M server may comprise a device management server or an information reporting server. The RDS port of the LwM2M client corresponding to the device management server or the information reporting server may be a predefined RDS port or may be configured by a bootstrap server.

In an embodiment of the disclosure, the RDS port of the LwM2M client corresponding to the device management server or the information reporting server may be configured by the bootstrap server through a 'LwM2M Security' object which includes an instance containing a RDS port of the LwM2M client corresponding to the device management server or the information reporting server.

In an embodiment of the disclosure, communicating with a LwM2M server may comprise receiving, from the network exposure node, a first message including a payload, the RDS ports of the network exposure node and the LwM2M client which correspond to the LwM2M server.

In an embodiment of the disclosure, the LwM2M client may have a 'LwM2M Security' object and a 'LwM2M Server' object each of which may be preconfigured or obtained from outside. The 'LwM2M Security' object may include, for each of the at least one LwM2M server, an instance containing a RDS port of the network exposure node corresponding to the LwM2M server. The 'LwM2M Server' object may include, for each of the at least one LwM2M server, an instance containing information related to the LwM2M server.

In an embodiment of the disclosure, the first message may be an instruction for performing an operation on the LwM2M client. The method may further comprise determining an ID of the LwM2M server based on the RDS port of the network exposure node corresponding to the LwM2M server, the 'LwM2M Security' object and the 'LwM2M Server' object. The method may further comprise determining whether the LwM2M server is permitted to perform the operation, based on the ID of the LwM2M server and an access control list (ACL).

In an embodiment of the disclosure, determining the ID of the LwM2M server may comprise determining, from the 'LwM2M Security' object, an instance ID of an instance containing the RDS port of the network exposure node corresponding to the LwM2M server. Determining the ID of the LwM2M server may comprise determining the ID of the LwM2M server from an instance having the same instance ID in the 'LwM2M Server' object.

In an embodiment of the disclosure, communicating with a LwM2M server may comprise sending, to the network exposure node, a second message including a payload, the RDS ports of the network exposure node and the LwM2M client which correspond to the LwM2M server, and an ID of the LwM2M client.

According to a third aspect of the disclosure, there is provided a method in a LwM2M server. The method comprises performing configuration such that the LwM2M server can communicate with a LwM2M client via a network exposure node over NIDD through RDS protocol. The method further comprises communicating with the LwM2M client via the network exposure node.

In an embodiment of the disclosure, the communication may be performed based on: a RDS port of the network exposure node corresponding to the LwM2M server; and a RDS port of the LwM2M client corresponding to the LwM2M server.

In an embodiment of the disclosure, the LwM2M server may be a bootstrap server. Both the RDS port of the network exposure node and the RDS port of the LwM2M client which correspond to the bootstrap server may be predefined RDS ports.

In an embodiment of the disclosure, the LwM2M server may be a device management server or an information reporting server. The RDS port of the LwM2M client corresponding to the device management server or the information reporting server may be a predefined RDS port or may be configured by a bootstrap server.

In an embodiment of the disclosure, the RDS port of the LwM2M client corresponding to the device management server or the information reporting server may be configured by the bootstrap server through a 'LwM2M Security' object which includes an instance containing a RDS port of the LwM2M client corresponding to the device management server or the information reporting server.

In an embodiment of the disclosure, performing the configuration may comprise obtaining, from the network exposure node, a configuration ID corresponding to the LwM2M client.

In an embodiment of the disclosure, communicating with the LwM2M client may comprise sending, to the network exposure node, a first message including a payload, the configuration ID, the RDS ports of the network exposure node and the LwM2M client which correspond to the LwM2M server.

In an embodiment of the disclosure, communicating with the LwM2M client may comprise receiving, from the network exposure node, a second message including a payload, the RDS ports of the LwM2M client and the network exposure node which correspond to the LwM2M server, and an ID of the LwM2M client.

According to a fourth aspect of the disclosure, there is provided a method in a management entity. The method comprises sending, to a network exposure node, configuration information for NIDD between a LwM2M client and a LwM2M server through RDS protocol. The method further comprises receiving, from the network exposure node, a configuration ID for the configuration information. The method further comprises sending the configuration ID to the LwM2M server.

In an embodiment of the disclosure, the configuration information may comprise an ID of the LwM2M client; an ID of the LwM2M server; a RDS port of the network exposure node corresponding to the LwM2M server; a RDS port of the LwM2M client corresponding to the LwM2M server; and a network address of the LwM2M server.

In an embodiment of the disclosure, the LwM2M server may be one of: a bootstrap server, a device management server and an information reporting server.

In an embodiment of the disclosure, both the RDS port of the network exposure node and the RDS port of the LwM2M client which correspond to the bootstrap server may be predefined RDS ports.

According to a fifth aspect of the disclosure, there is provided a network exposure node. The network exposure node comprises at least one processor and at least one memory. The at least one memory contains instructions executable by the at least one processor, whereby the network exposure node is operative to perform configuration such that the network exposure node can transfer traffic between a LwM2M client and at least one LwM2M server over NIDD through RDS protocol. The network exposure node is further operative to transfer traffic between the LwM2M client and the at least one LwM2M server based on the configuration.

In an embodiment of the disclosure, the network exposure node may be operative to perform the method according to the above first aspect.

According to a sixth aspect of the disclosure, there is provided a LwM2M client. The LwM2M client comprises at least one processor and at least one memory. The at least one memory contains instructions executable by the at least one processor, whereby the LwM2M client is operative to communicate with at least one LwM2M server over NIDD via a network exposure node through RDS protocol.

In an embodiment of the disclosure, the LwM2M client may be operative to perform the method according to the above second aspect.

According to a seventh aspect of the disclosure, there is provided a LwM2M server. The LwM2M server comprises at least one processor and at least one memory. The at least one memory contains instructions executable by the at least one processor, whereby the LwM2M server is operative to perform configuration such that the LwM2M server can communicate with a LwM2M client via a network exposure node over NIDD through RDS protocol. The LwM2M server is further operative to communicate with the LwM2M client via the network exposure node.

In an embodiment of the disclosure, the LwM2M server may be operative to perform the method according to the above third aspect.

According to an eighth aspect of the disclosure, there is provided a management entity. The management entity comprises at least one processor and at least one memory. The at least one memory contains instructions executable by the at least one processor, whereby the management entity is operative to send, to a network exposure node, configuration information for NIDD between a LwM2M client and a LwM2M server through RDS protocol. The management entity is further operative to receive, from the network exposure node, a configuration ID for the configuration information. The management entity is further operative to send the configuration ID to the LwM2M server.

In an embodiment of the disclosure, the management entity may be operative to perform the method according to the above fourth aspect.

According to a ninth aspect of the disclosure, there is provided a computer program product. The computer program product comprises instructions which when executed by at least one processor, cause the at least one processor to perform the method according to any of the above first to fourth aspects.

According to a tenth aspect of the disclosure, there is provided a computer readable storage medium. The computer readable storage medium comprises instructions which when executed by at least one processor, cause the at least one processor to perform the method according to any of the above first to fourth aspects.

According to an eleventh aspect of the disclosure, there is provided a network exposure node. The network exposure node comprises a configuration module for performing configuration such that the network exposure node can transfer traffic between a LwM2M client and at least one LwM2M server over NIDD through RDS protocol. The network exposure node further comprises a transferring module for transferring traffic between the LwM2M client and the at least one LwM2M server based on the configuration.

According to a twelfth aspect of the disclosure, there is provided a LwM2M client. The LwM2M client comprises a communication module for communicating with at least one LwM2M server over NIDD via a network exposure node through RDS protocol.

According to a thirteenth aspect of the disclosure, there is provided a LwM2M server. The LwM2M server comprises a configuration module for performing configuration such that the LwM2M server can communicate with a LwM2M client via a network exposure node over NIDD through RDS protocol. The LwM2M server further comprises a communication module for communicating with the LwM2M client via the network exposure node.

According to a fourteenth aspect of the disclosure, there is provided a management entity. The management entity comprises a first sending module for sending, to a network exposure node, configuration information for NIDD between a LwM2M client and a LwM2M server through RDS protocol. The management entity further comprises a reception module for receiving, from the network exposure node, a configuration ID for the configuration information. The management entity further comprises a second sending module for sending the configuration ID to the LwM2M server.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

References in the specification to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Some of the embodiments described separately or independently hereafter may also be implemented in combination depending on various application scenarios.

Figure 1:
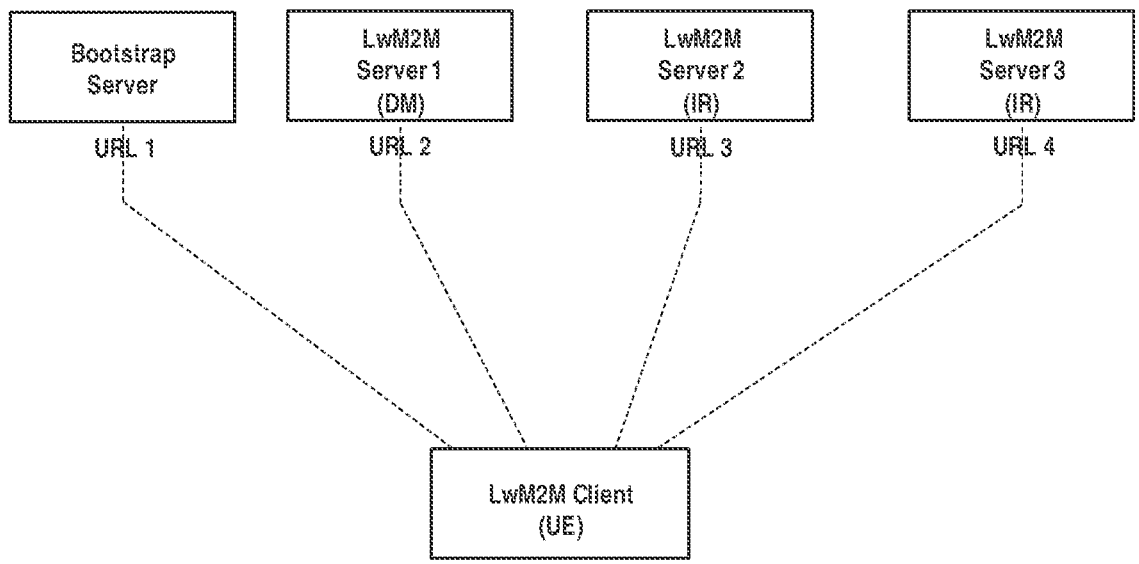
FIG. 1 shows LwM2M server access for IP binding.
Figure 2:
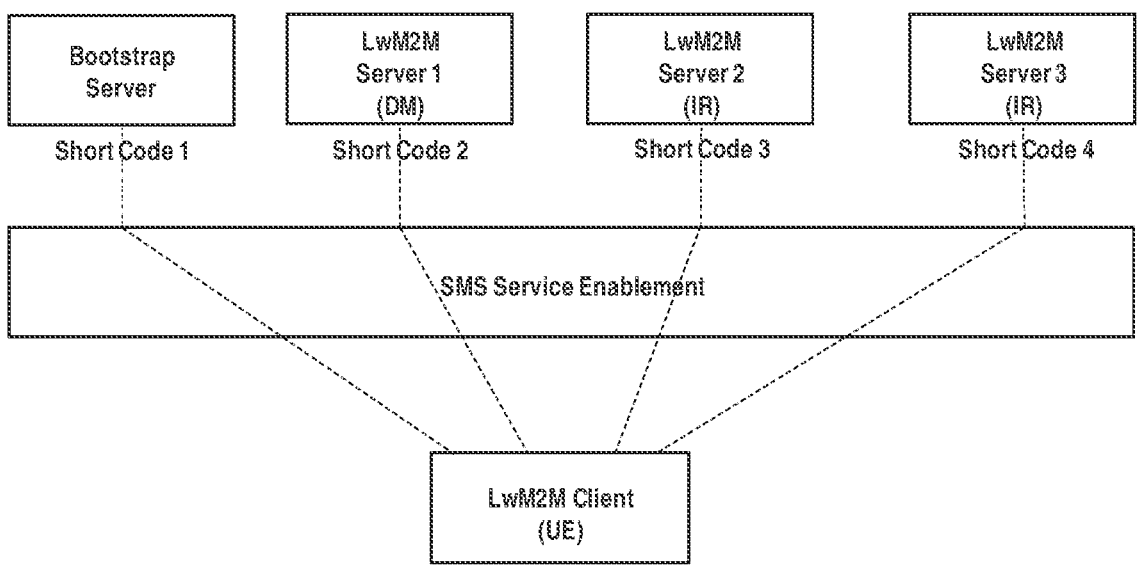
FIG. 2 shows LwM2M server access for SMS binding.
Figure 3:
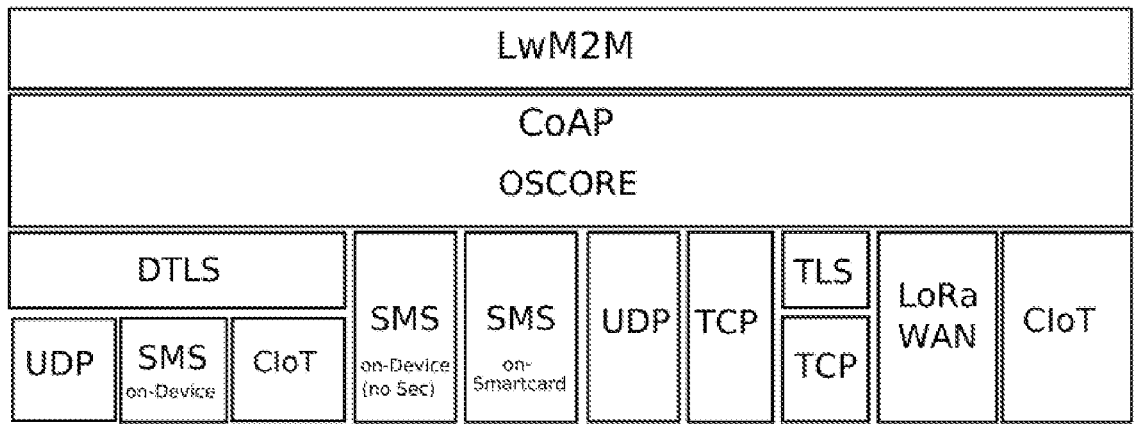
FIG. 3 shows a protocol stack for LwM2M 1.1 enabler.

Compared with LwM2M 1.0, LwM2M 1.1 adds an additional transport binding for non-IP to improve support for low power wide area (LPWA) networks including 3rd generation partnership project (3GPP) cellular IoT (CIoT) and long rang WAN (LoRaWAN). The term IoT refers to Internet of things and the term WAN refers to wide area network. FIG. 3 shows the LwM2M 1.1 protocol stack. It illustrates the available transport bindings: UDP, TCP, SMS and CIoT for non-IP. The transport bindings can be used in combination with different security mechanisms including datagram transport layer security (DTLS) and/or object security for constrained RESTful environments (OSCORE). The term REST refers to representational state transfer. The standard operations such as bootstrapping, registration, information reporting and device management for LwM2M devices are identical in both LPWA and non-LPWA networks.

Even though the latest LwM2M 1.1 technical specification (TS) adds a non-IP binding to support devices operating in LPWA networks, it does not provide detailed implementation or example to support multiple LwM2M servers over non-IP data delivery (NIDD), and the current multiple LwM2M servers support from LwM2M standardization solution is only applicable for IP and SMS binding. In 'LwM2M Security' object, there is no specific item defined for non-IP binding.

"OMA-TS-LightweightM2M_Transport" chapter D.3 "NIDD via SCEF" mentions: obviously in non-IP mode the device is not able to address LwM2M server(s) via their IP addresses. If NIDD via SCEF is selected, all data goes via the SCEF. Thus, the user equipment (UE) can only talk to one LwM2M server since there is no additional information available at the IP layer that allows to selectively address more than one LwM2M server. This information would for regular LwM2M be available in the IP header. The term OMA refers to open mobile alliance and the term SCEF refers to service capability exposure function.

An alternative would be to have an intermediary node between SCEF and LwM2M server. Such a node could then inspect the constrained application protocol (CoAP) messages for routing information such as URI-host and forward the messages accordingly to different LwM2M servers.

Figure 4:
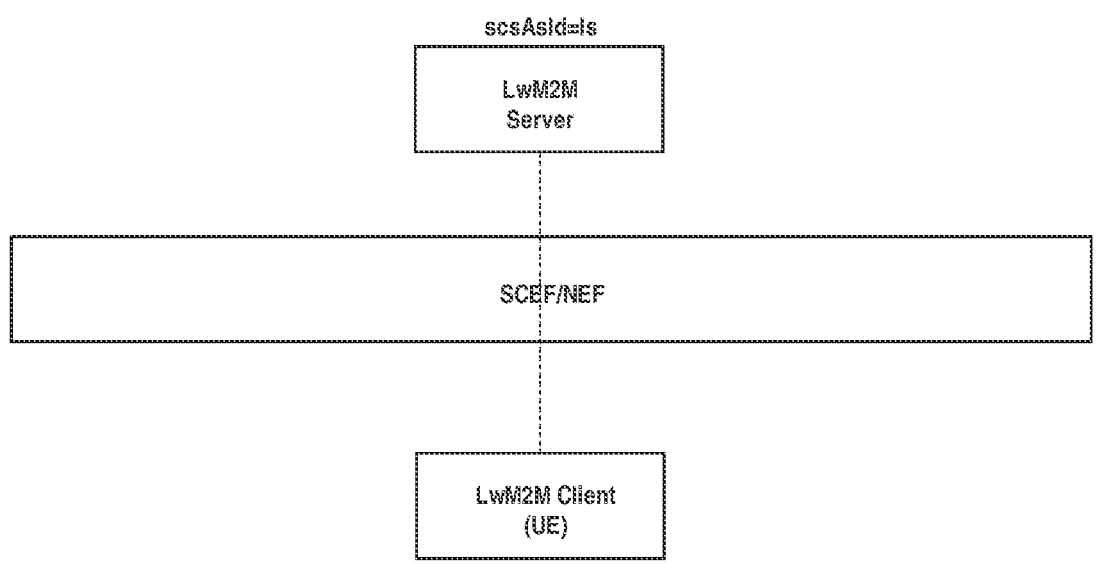
FIG. 4 shows an example for LwM2M server access for Non-IP binding.
Figure 5:
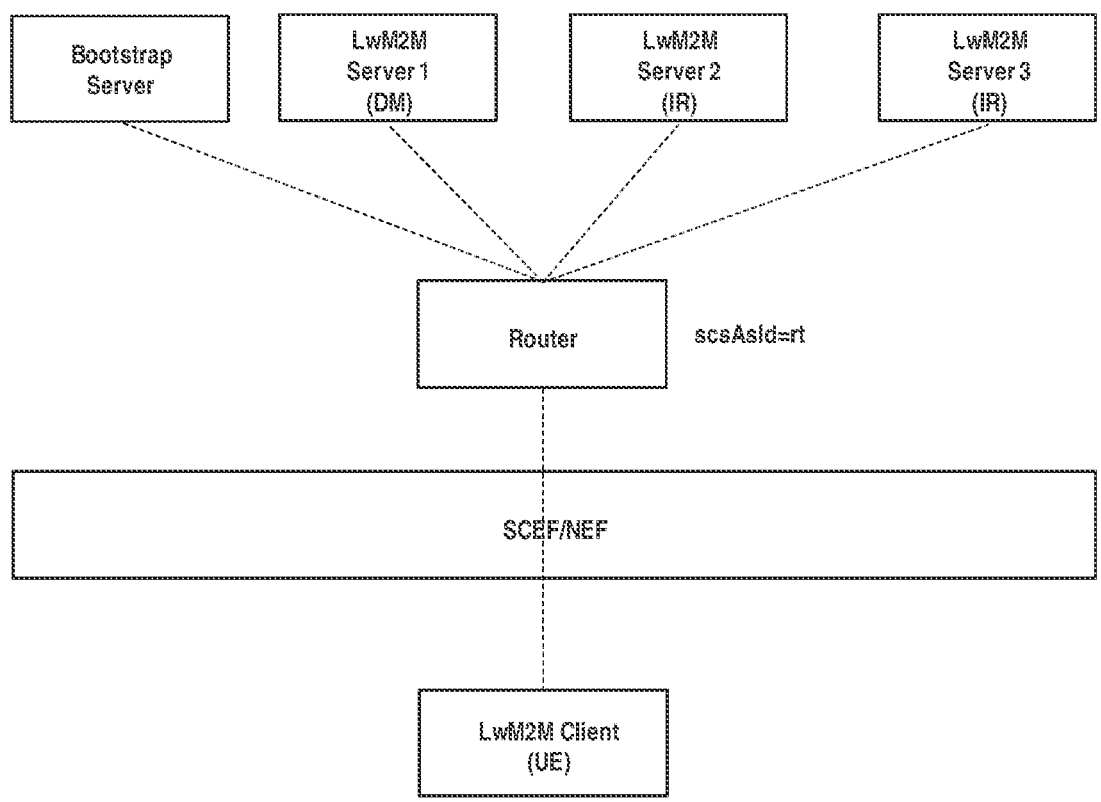
FIG. 5 shows another example for LwM2M server access for Non-IP binding.

Therefore, without extra support, LwM2M over NIDD can either support only a single LwM2M server as shown in FIG. 4. Or there is a possible solution to support multiple LwM2M servers for non-IP binding. A Router function may be introduced as shown in FIG. 5 to route the messages among different LwM2M servers based on some attributes in the LwM2M messages. From SCEF/network exposure function (NEF) point of view, the router is an application server.

The solution shown in FIG. 5 mainly has the following drawbacks. Firstly, the router is another traffic node which needs to parse all LwM2M messages in order to do the dispatching. Secondly, in LwM2M scenario, multiple LwM2M servers (including bootstrap server) may come from different partners or organizations. A typical example may be as below: the bootstrap server is owned by a telecom operator; a LwM2M server for device management is owned by the device manufacturer or telecom operator; a LwM2M server for information reporting is owned by the device owner or IoT application provider. Because LwM2M servers may come from different partners, but the centric router has the ability to intercept the traffic, there are security concerns. In addition, there is no standardization for router function.

The present disclosure proposes an improved solution for communication between LwM2M client and server. Hereinafter, the solution will be described in detail with reference to FIGS. 6-23.

As used herein, the term "communication system" refers to a system following any suitable communication standards, such as the first generation (1G), 2G, 2.5G, 2.75G, 3G, 4G, 4.5G, 5G communication protocols, and/or any other protocols either currently known or to be developed in the future. Furthermore, the communications between a terminal device and a network node in the communication system may be performed according to any suitable generation communication protocols, including, but not limited to, 1G, 2G, 2.5G, 2.75G, 3G, 4G, 4.5G, 5G communication protocols, and/or any other protocols either currently known or to be developed in the future.

In the following, different terms may refer to a same or similar network function or network node with the same or similar functionality in different communication systems.

For example, the network exposure function may be called SCEF in 4G and NEF in 5G respectively. Thus, the specific terms used herein do not limit the present disclosure only to the communication system related to the specific terms, which however can be more generally applied to other communication systems.

Figure 6:
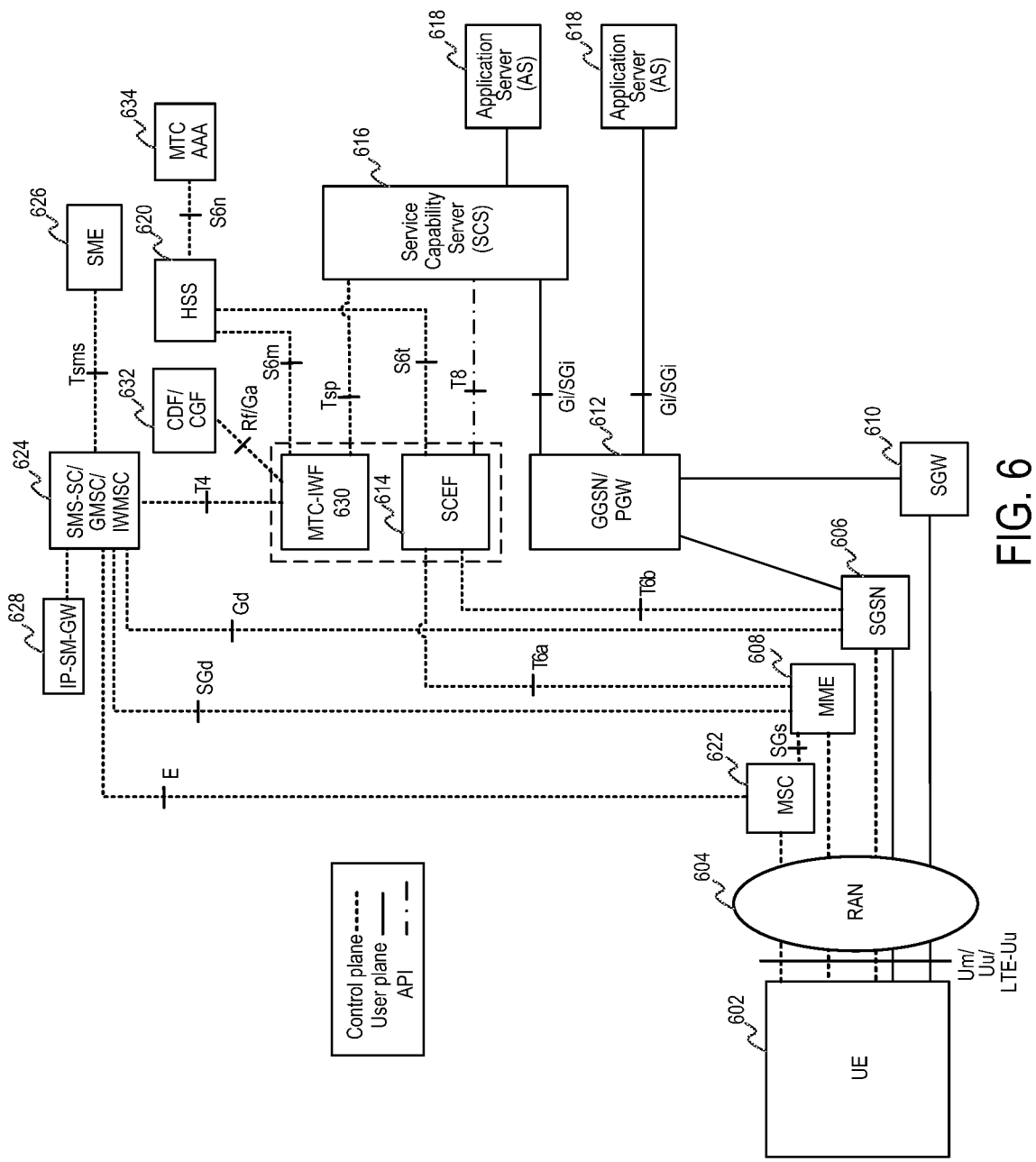
FIG. 6 is a diagram showing an exemplary communication system into which an embodiment of the disclosure is applicable.

FIG. 6 is a diagram showing an exemplary communication system into which an embodiment of the disclosure is applicable. As shown, the communication system comprises a user equipment (UE) 602, a radio access network (RAN) 604, a serving general packet radio service (GPRS) support node (SGSN) 606, a mobility management entity (MME) 608, a serving gateway (SGW) 610, a gateway GPRS support node (GGSN)/packet data network (PDN) gateway (PGW) 612, a service capability exposure function (SCEF) 614, a service capability server (SCS) 616, an application server (AS) 618 and a home subscriber server (HSS) 620. Note that the number of each entity mentioned above may be more than one.

The UE 602 can communicate through a radio access communication link with the RAN 604. The UE may also be referred to as, for example, terminal device, access terminal, mobile station, mobile unit, subscriber station, or the like. It may refer to any end device that can access a wireless communication network and receive services therefrom. By way of example and not limitation, the UE may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a UE may represent a machine or other device that performs monitoring and/or measurements, and transmits the results of such monitoring and/or measurements to another UE and/or a network equipment. In this case, the UE may be a machine-to-machine (M2M) device (e.g. a LwM2M client), which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

The RAN 604 may include, for example, a universal mobile telecommunications system (UMTS) terrestrial RAN (UTRAN), a global system for mobile communication (GSM) enhanced data rate for GSM evolution (EDGE) RAN (GERAN), and/or an evolved universal terrestrial RAN (E-UTRAN). The UTRAN and the GERAN can each include radio network controller (RNC) nodes to control communications through radio base stations providing radio access communication links to UEs that are within their respective communication service cells. The E-UTRAN can include radio base station nodes (eNodeBs or eNBs) that can provide the combined functionality of the RNC nodes and base stations of the UTRAN and the GERAN.

The SGSN 606 is a core network node in the UMTS and has a user-plane function and a control-plane function. The user-plane function of the SGSN 606 can transfer user data packets of the UE 602 between the RAN 604 and the GGSN/PGW 612. The control-plane function of the SGSN 606 can carry out mobility management of the UE 602, bearer management and the like. The MME 608 is a core network node in evolved packet system (EPS) and can carry out the mobility management of the UE 602, the bearer management, and the like. The SGW 610 is a packet transfer node in the core network of the EPS. The SGW 610 can transfer user data packets of the UE 602 between the RAN 604 and the GGSN/PGW 612.

The GGSN is a core network node in the UMTS. The PGW is a core network node in the EPS. The GGSN/PGW 612 means either the GGSN or the PGW or both. The GGSN/PGW 612 is a user-plane packet transfer node in the core network and can transfer user data packets of the UE 602. The GGSN/PGW 612 can serve as a gateway to an external PDN and provide the UE 602 with the connectivity to the external PDN.

The SCEF 614 can securely expose the services and capabilities provided by 3GPP networks by providing access to the services and capabilities through homogenous network application programming interfaces (APIs) defined by open mobile alliance (OMA), GSM alliance (GSMA) and possibly other standardization bodies. The SCS 616 can make open service access (OSA) standard interfaces accessible by application and provide an abstraction of network protocol for application developers. As a gateway between applications and the network, the SCS 620 can accomplish mapping of OSA interfaces onto network protocols and vice versa. The AS 618 may be a type of server designed to install, operate and host applications and associated services for users. The HSS 620 is a control-plane node in the core network of 3GPP public land mobile network (PLMN) and can manage subscriber information of the UE 602.

As shown in FIG. 6, the communication system may further comprise a mobile switching center (MSC) 622, a short message service (SMS)-service center (SC)/gateway mobile switching center (GMSC)/interworking MSC (IWMSC) 624, a short message entity (SME) 626, an IP-short message (SM)-gateway (GW) 628, a machine-type communication (MTC)-interworking function (IWF) 630, a charge data function (CDF)/charge gateway function (CGF) 632 and an MTC-authentication, authorization and accounting (AAA) 634. It should be noted that the MME 608, the SGW 610, the PGW 612, the SCEF 614 and the HSS 620 are merely exemplary examples of the components in the communication system and may be replaced by components with similar functionalities. For example, in 5G system, the MME may be replaced by an access and mobility management function (AMF), the SGW and the PGW may be replaced by a user plane function (UPF), the SCEF may be replaced by a network exposure function (NEF), and the HSS may be replaced by a unified data management (UDM).

Figure 7:
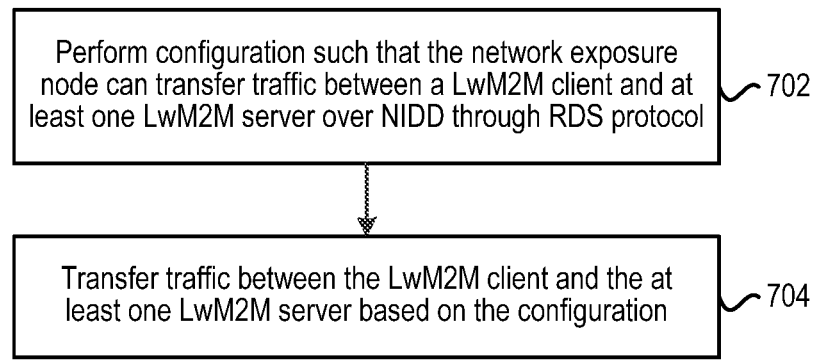
FIG. 7 is a flowchart illustrating a method implemented at a network exposure node according to an embodiment of the disclosure.

FIG. 7 is a flowchart illustrating a method implemented at a network exposure node according to an embodiment of the disclosure. The network exposure node may be an SCEF, an NEF, or any other entity having similar functionality. At block 702, the network exposure node performs configuration such that the network exposure node can transfer traffic between a LwM2M client and at least one LwM2M server over NIDD through reliable data service (RDS) protocol. The LwM2M client may be a terminal device or a UE. The examples of the LwM2M server may include, but not limited to, a bootstrap server, a device management (DM) server and an information reporting (IR) server.

The RDS is introduced in 3GPP TS 24.250 to NIDD. The RDS protocol supports the following requirements:
1) RDS supports peer-to-peer data transfers and shall provide reliable data delivery between the UE and the SCEF or PGW. The data is transferred via a PDN connection between the UE and SCEF or PGW.
2) A UE can connect to multiple SCEFs or PGWs. A UE can connect to multiple SCS/AS via the SCEF or PGW.
3) RDS shall support multiple applications on the UE to simultaneously conduct data transfers with their peer entities on the SCEF or PGW using a single PDN connection between the UE and SCEF or PGW.

4) RDS shall support both acknowledged and unacknowledged data transfers.

5) RDS shall support variable-length frames and shall allow detection and elimination of duplicate frames at the receiving endpoint.

Thus, by applying RDS into the NIDD communication between the LwM2M client and server, LwM2M non-IP binding can be enabled to support at least one LwM2M server, especially multiple LwM2M servers which may include bootstrap server.

Figure 8:
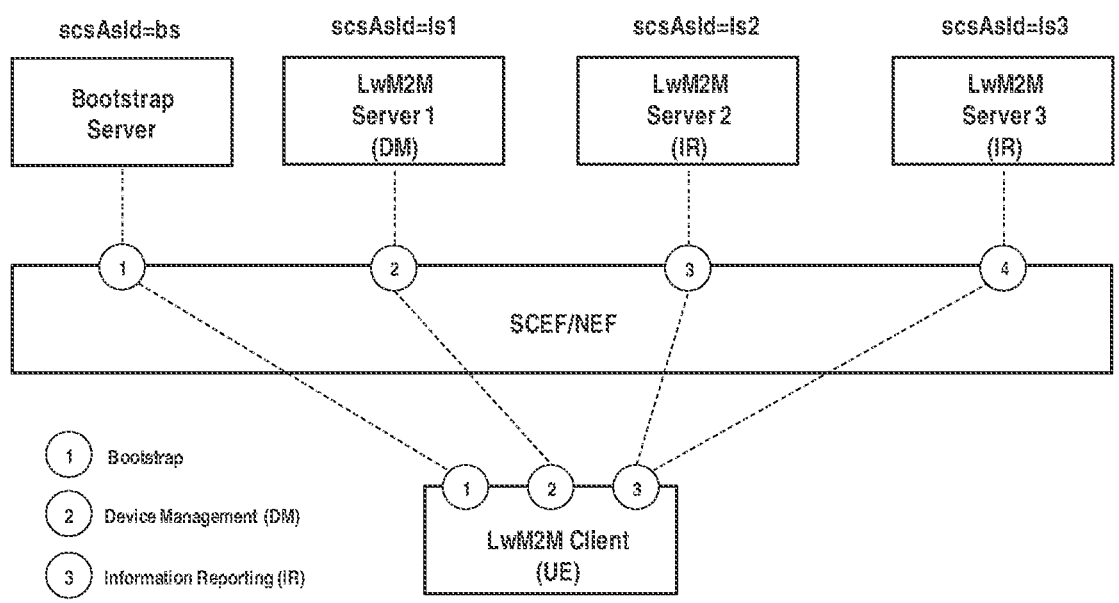
FIG. 8 shows an example of RDS ports planning.

For example, the configuration performed at block 702 may result in or cause: at least one RDS port of the network exposure node each of which corresponds to one of the at least one LwM2M server; and at least one RDS port of the LwM2M client each of which corresponds to one or more of the at least one LwM2M server. FIG. 8 shows an exemplary example of RDS ports planning. In this example, the network exposure node is an SCEF/NEF. In the UE side, the UE ports map to different LwM2M operations, i.e. bootstrapping, device management (DM), and information reporting (IR). In other words, the UE ports may map to different LwM2M servers in a one-to-one or one-to-multiple correspondence. Optionally, the UE ports may be standardized in LwM2M protocol. In the AS side, each LwM2M server (including bootstrap server) is regarded as an AS and maps to an SCEF port. In other words, the RDS SCEF ports may map to different LwM2M servers in a one-to-one correspondence. Optionally, the SCEF port of the bootstrap server may be standardized.

In the example of FIG. 8, a pair of RDS ports is introduced to the NIDD communication between the AS and the UE: the SCEF port and the UE port. The port pair enables the UE to communicate with more than one application servers. In addition, multiple LwM2M servers from different partners can also be supported with security consideration. Note that the term SCEF port is merely an exemplary example for illustration purpose. In a case that the network exposure node is an NEF, the term NEF port may be used accordingly.

Optionally, the at least one LwM2M server may comprise a bootstrap server and both the RDS port of the network exposure node and the RDS port of the LwM2M client which correspond to the bootstrap server may be predefined RDS ports. In this way, the manufacturing of the client device can be simplified since no extra bootstrapping information needs to be pre-provisioned to the client device during factory phase. Comparing with LwM2M IP binding or SMS binding, URI or SMS short code of the bootstrap server needs to be pre-provisioned to the client device during factory phase.

Note that since no extra bootstrapping information needs to be pre-provisioned to the client device during factory phase, both the RDS port of the network exposure node and the RDS port of the LwM2M client which correspond to any other LwM2M server (e.g. a device management server, or an information reporting server) besides the bootstrap server may be configured by the bootstrap server. Thus, the RDS port of the network exposure node corresponding to the device management server or the information reporting server may be a predefined RDS port or may be configured by the bootstrap server. Likewise, the RDS port of the LwM2M client corresponding to the device management server or the information reporting server may be a predefined RDS port or may be configured by the bootstrap server.

Figure 9:
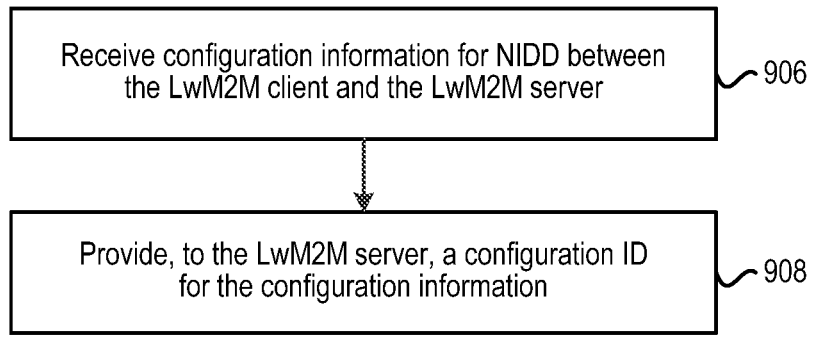
FIG. 9 is a flowchart for explaining the method of FIG. 7.

For example, block 702 may be implemented as blocks 906-908 of FIG. 9. At block 906, the network exposure node receives configuration information for NIDD between the LwM2M client and a LwM2M server. For example, the configuration information may be received from a management entity or the LwM2M server. The management entity (or management function) may be a portal for device manufacturers or for application developers. The configuration information may comprises: an ID (e.g. an external ID) of the LwM2M client; an ID (e.g. an SCS/AS ID) of the LwM2M server; a RDS port of the network exposure node (e.g. a RDS SCEF port) corresponding to the LwM2M server; a RDS port of the LwM2M client (e.g. a RDS UE port) corresponding to the LwM2M server; and a network address (e.g. a URL) of the LwM2M server. As an exemplary example, for NIDD between the UE and the bootstrap server shown in FIG. 8, the configuration information may be represented as: NIDDConfiguration (scsAsId=bs, externalId, rdsPort.portUE=1, rdsPort.portSCEF=1, callbackUrl).

At block 908, the network exposure node provides, to the LwM2M server, a configuration ID for the configuration information. If the configuration information is received from the management entity mentioned above, the configuration ID may be provided to the LwM2M server indirectly via the management entity. If the configuration information is received from the LwM2M server, the configuration ID may be provided directly to the LwM2M server.

Referring back to FIG. 7, at block 704, the network exposure node transfers traffic between the LwM2M client and the at least one LwM2M server based on the configuration. The configuration may have the configuration ID obtained at block 908 and the configuration information obtained at block 906. Depending on the direction of the traffic, e.g. whether the traffic is mobile terminating (MT) or mobile originating (MO) traffic, block 704 may be implemented as blocks 1010-1014 of FIG. 10 or blocks 1116-1120 of FIG. 11.

Figure 10:
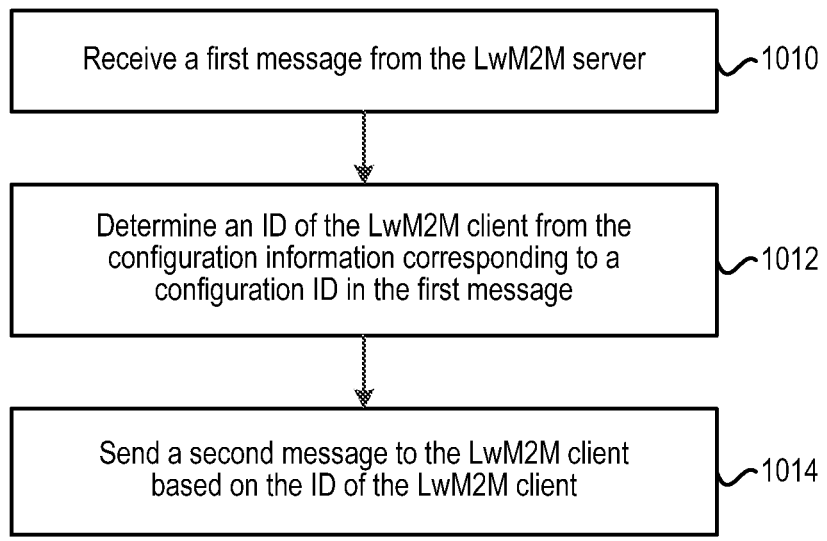
FIG. 10 is another flowchart for explaining the method of FIG. 7.

In the MT case shown in FIG. 10, at block 1010, the network exposure node receives a first message from the LwM2M server. The first message includes a payload, the configuration ID corresponding to the LwM2M client, the RDS ports of the network exposure node and the LwM2M client which correspond to the LwM2M server. Examples of the first message may include, but not limited to, a Bootstrap-Operation message, an Ack message, a Write message, a Read message, an Execute message, a Create message, and a Delete message. At block 1012, the network exposure node determines an ID of the LwM2M client from the configuration information corresponding to the configuration ID. At block 1014, the network exposure node sends a second message to the LwM2M client based on the ID of the LwM2M client. The second message includes the payload, the RDS ports of the network exposure node and the LwM2M client which correspond to the LwM2M server.

Figure 11:
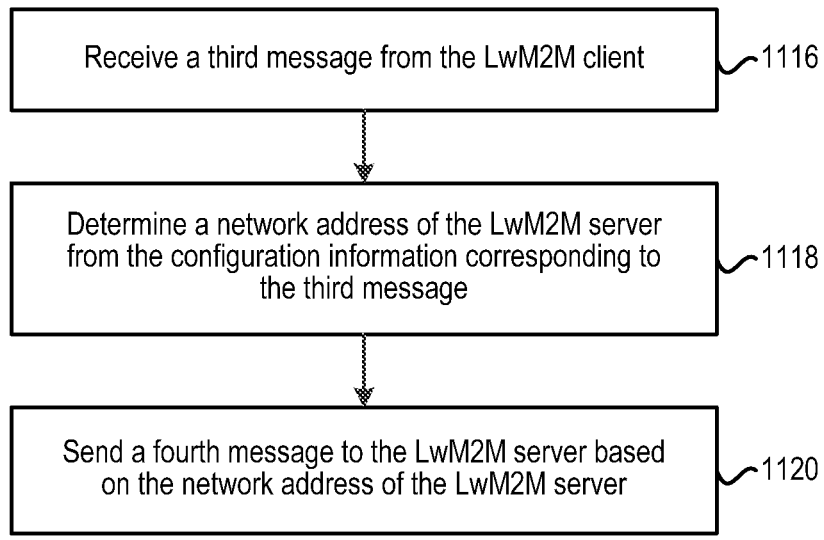
FIG. 11 is another flowchart for explaining the method of FIG. 7.

In the MO case shown in FIG. 11, at block 1116, the network exposure node receives, from the LwM2M client, a third message including a payload, the RDS ports of the LwM2M client and the network exposure node which correspond to the LwM2M server, and an ID of the LwM2M client. Examples of the third message may include, but not limited to, a Bootstrap-Request message, a Bootstrap-Finish message, a Register message, and an Ack message. At block 1118, the network exposure node determines a network address of the LwM2M server from the configuration information corresponding to the RDS ports of the LwM2M client and the network exposure node and the ID of the LwM2M client. At block 1120, the network exposure node sends a fourth message to the LwM2M server based on the network address of the LwM2M server. The fourth message includes the payload, the RDS ports of the LwM2M client and the network exposure node, and the ID of the LwM2M client. The ID of the LwM2M client may be used by the LwM2M server to determine which client has sent the message.

Figure 12:
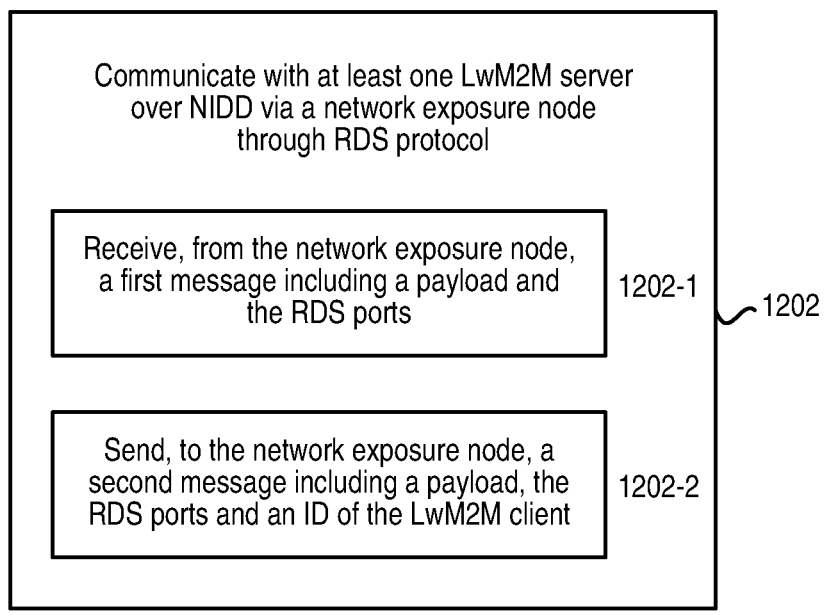
FIG. 12 is a flowchart illustrating a method implemented at a LwM2M client according to an embodiment of the disclosure.

FIG. 12 is a flowchart illustrating a method implemented at a LwM2M client according to an embodiment of the disclosure. The LwM2M client may be a terminal device or a UE. At block 1202, the LwM2M client communicates with at least one LwM2M server over NIDD via a network exposure node through RDS protocol. The network exposure node may be an SCEF, an NEF, or any other entity having similar functionality. As described above, by applying RDS into the NIDD communication between the LwM2M client and server, LwM2M non-IP binding can be enabled to support at least one LwM2M server, especially multiple LwM2M servers. For example, the communication may be performed based on: at least one RDS port of the network exposure node each of which corresponds to one of the at least one LwM2M server; and at least one RDS port of the LwM2M client each of which corresponds to one or more of the at least one LwM2M server. Details about the RDS ports have been described above and thus are omitted here.

As shown, block 1202 may include block 1202-1 and/or block 1202-2. At block 1202-1, the LwM2M client receives, from the network exposure node, a first message including a payload, the RDS ports of the network exposure node and the LwM2M client which correspond to the LwM2M server. As described above for the MT case, examples of the first message may include, but not limited to, a Bootstrap-Operation message, an Ack message, a Write message, a Read message, an Execute message, a Create message, and a Delete message.

As mentioned above, the RDS port of the LwM2M client corresponding to the device management server or the information reporting server may be a predefined RDS port or may be configured by the bootstrap server. In the latter case, the bootstrap server may configure the RDS port by sending a Bootstrap-Operation message to the LwM2M client. The Bootstrap-Operation message may contain a 'LwM2M Security' object which includes an instance containing a RDS port of the LwM2M client corresponding to the device management server or the information reporting server. Thus, the LwM2M client may have a 'LwM2M Security' object which is preconfigured or obtained from outside. The 'LwM2M Security' object may include, for each of the at least one LwM2M server, an instance containing a RDS port of the LwM2M client corresponding to the LwM2M server.

Upon receipt of the first message, to identify which server has sent the first message, the LwM2M client may determine an ID (e.g. a short server ID simply referred to as SSID) of the LwM2M server based on the RDS port of the network exposure node corresponding to the LwM2M server, a 'LwM2M Security' object and a 'LwM2M Server' object. The 'LwM2M Security' object may be preconfigured in the LwM2M client or obtained from outside (e.g. received from a bootstrap server in a Bootstrap-Operation message). The 'LwM2M Security' object may include, for each of the at least one LwM2M server, an instance containing a RDS port of the network exposure node corresponding to the LwM2M server. Similar as the 'LwM2M Security' object, the 'LwM2M Server' object may be preconfigured in the LwM2M client or obtained from outside. The 'LwM2M Server' object may include, for each of the at least one LwM2M server, an instance containing information related to the LwM2M server.

Figure 14:
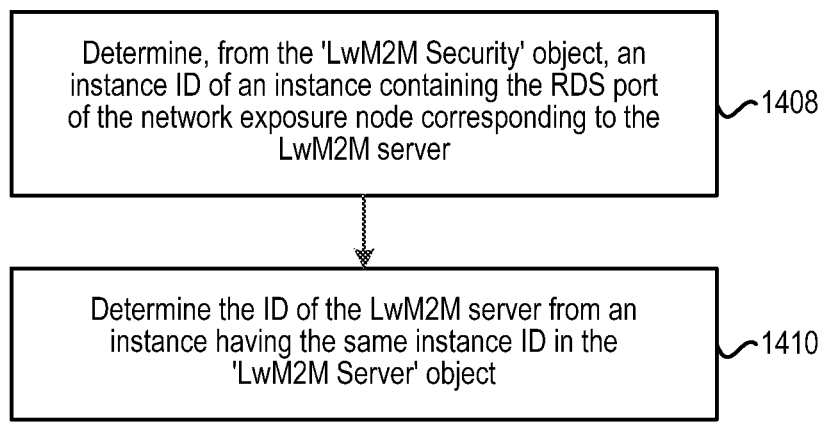
FIG. 14 is a flowchart illustrating a method implemented at a LwM2M client according to an embodiment of the disclosure.

For example, the determination of the ID of the LwM2M server may be performed by using the method shown in FIG. 14. At block 1408, the LwM2M client determines, from the 'LwM2M Security' object, an instance ID of an instance containing the RDS port of the network exposure node corresponding to the LwM2M server. At block 1410, the LwM2M client determines the ID of the LwM2M server from an instance having the same instance ID in the 'LwM2M Server' object. In this way, by extending the existing 'LwM2M Security' object to include the RDS port of the network exposure node (e.g. SCEF/NEF port), which server has sent the first message can be identified. The above extension is proposed in view of that the 'LwM2M Security' object contains LwM2M Server URI and SMS Code for other bindings. Note that other alternative extensions with the same effect are also possible.

As an exemplary example, the extended 'LwM2M Security' object schema may be represented as below (with the extension being underlined):

```
<LWM2M xmlns:xsi="http://www.w3.org/2001/XMLSchema-instance"
xsi:noNamespaceSchemaLocation="http://www.openmobilealliance.org/
tech/profiles/LWM2
M-v1_1.xsd">
   <Object ObjectType="MODefinition">
      <Name>LWM2M Security</Name>
      <Description1>
      </Description1>
      <ObjectID>0</ObjectID>
      <ObjectURN>urn:oma:lwm2m:oma:0:1.1</ObjectURN>
      <LWM2MVersion>1.1</LWM2MVersion>
      <ObjectVersion>1.1</ObjectVersion>
      <MultipleInstances>Multiple</MultipleInstances>
      <Mandatory>Mandatory</Mandatory>
      <Resources>
         <Item ID="0">
            <Name>LWM2M Server URI</Name>
            <Operations/>
            <MultipleInstances>Single</MultipleInstances>
            <Mandatory>Mandatory</Mandatory>
            <Type>String</Type>
            <RangeEnumeration>0-255 bytes</RangeEnumeration>
            <Units/>
            <Description>
            </Description>
         </Item>
         ......
         <Item ID="9">
            <Name>LwM2M Server SMS Number</Name>
            <Operations/>
            <MultipleInstances>Single</MultipleInstances>
            <Mandatory>Optional</Mandatory>
            <Type>String</Type>
            <RangeEnumeration/>
            <Units/>
            <Description>
            </Description>
         ......
         <Item ID="18">
            <Name>LWM2M Server SCEF Port</Name>
            <Operations/>
            <MultipleInstances>Single</MultipleInstances>
            <Mandatory>Mandatory</Mandatory>
            <Type>Integer</Type>
            <RangeEnumeration>0-15</RangeEnumeration>
            <Units/>
            <Description>
            </Description>
         </Item>
         <Item ID="19">
            <Name>LWM2M ClientUE Port</Name>
            <Operations/>
```

```
        <MultipleInstances>Single</MultipleInstances>
        <Mandatory>Optional</Mandatory>
        <Type>Integer</Type>
        <RangeEnumeration>0-15</RangeEnumeration>
        <Units/>
        <Description>
        </Description>
      </Item>
      ......
    </Resources>
    <Description2>
    </Description2>
  </Object>
</LWM2M>
```

As shown in the above schema, since LwM2M Client UE Port is added in the 'LwM2M Security' object, the RDS ports in the UE side do not need to be hardcoded but could be configured through bootstrapping. This also holds true for the LWM2M Server SCEF Port.

For ease of understanding the method of FIG. 14, suppose that the LwM2M client receives an operation message from the LwM2M server, whose Source Port (SCEF Port) is 3. Then, the LwM2M client may look up its 'LwM2M Security' object instances and find that /0/1 contains SCEF Port 3, where '0' in '/0/1' is the object ID and '1' in '0/1' is the instance ID. Then, the LwM2M client may get /1/1, which is the same instance of the 'LwM2M Server' object and find the corresponding SSID.

Figure 13:
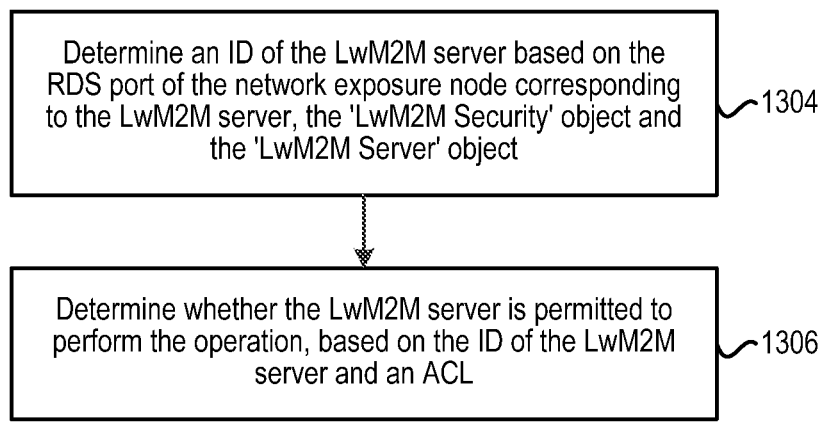
FIG. 13 is a flowchart illustrating a method implemented at a LwM2M client according to an embodiment of the disclosure.

If the received first message is an instruction for performing an operation on the LwM2M client, the method of FIG. 13 may be performed to determine whether or not to allow this operation. At block 1304, the LwM2M client determines an ID (e.g. SSID) of the LwM2M server based on the RDS port of the network exposure node corresponding to the LwM2M server, the 'LwM2M Security' object and the 'LwM2M Server' object. As described above, this may be implemented as blocks 1408-1410 of FIG. 14. At block 1306, the LwM2M client determines whether the LwM2M server is permitted to perform the operation, based on the ID of the LwM2M server and an access control list (ACL). The ACL may be preconfigured in the LwM2M client or obtained from outside. If the ACL indicates that the determined LwM2M server has the permission to perform the operation, the operation may be performed. Otherwise, the operation may be rejected.

Referring back to FIG. 12, at block 1202-2, the LwM2M client sends, to the network exposure node, a second message including a payload, the RDS ports of the network exposure node and the LwM2M client which correspond to the LwM2M server, and an ID of the LwM2M client. As described above for the MO case, examples of the second message may include, but not limited to, a Bootstrap-Request message, a Bootstrap-Finish message, a Register message, and an Ack message.

As mentioned above, the RDS port of the LwM2M client corresponding to any other LwM2M server (e.g. a device management server, or an information reporting server) besides the bootstrap server may be configured by the bootstrap server through the 'LwM2M Security' object. When the LwM2M client needs to send a second message to such a LwM2M server other than the bootstrap server, the RDS port of the LwM2M client corresponding to the LwM2M server may be known from the 'LwM2M Security' object as described below. Firstly, the LwM2M client may determine, from the 'LwM2M Server' object, an instance ID of an instance containing the ID of the LwM2M server. Then, the LwM2M client may determine the RDS port of the LwM2M client corresponding to the LwM2M server, from an instance having the same instance ID in the 'LwM2M Security' object. This also holds true for the determination of the RDS port of the network exposure node corresponding to the LwM2M server.

Figure 15:
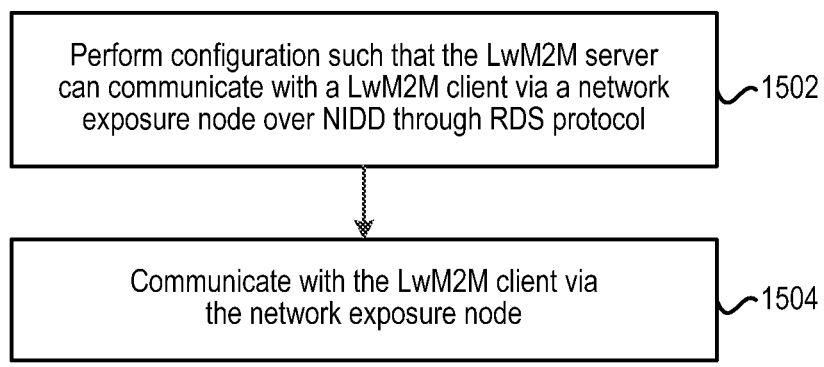
FIG. 15 is a flowchart illustrating a method implemented at a LwM2M server according to an embodiment of the disclosure.

FIG. 15 is a flowchart illustrating a method implemented at a LwM2M server according to an embodiment of the disclosure. The examples of the LwM2M server may include, but not limited to, a bootstrap server, a DM server and an IR server. At block 1502, the LwM2M server performs configuration such that the LwM2M server can communicate with a LwM2M client via a network exposure node over NIDD through RDS protocol. As described above, by applying RDS into the NIDD communication between the LwM2M client and server, LwM2M non-IP binding can be enabled to support at least one LwM2M server, especially multiple LwM2M servers. For example, the communication may be performed based on: a RDS port of the network exposure node corresponding to the LwM2M server; and a RDS port of the LwM2M client corresponding to the LwM2M server. Details about the RDS ports have been described above and thus are omitted here.

Figure 16A:
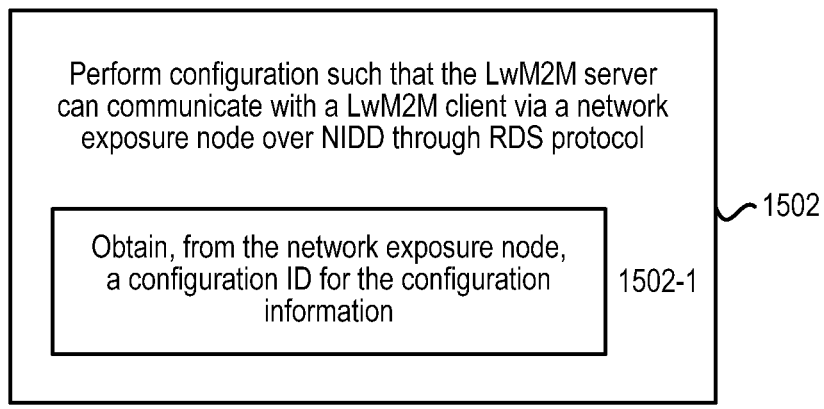
FIGS. 16A-16B are flowcharts for explaining the method of FIG. 15.

For example, the configuration may be performed by obtaining, from the network exposure node, a configuration ID corresponding to the LwM2M client at block 1502-1 as shown in FIG. 16A. If the management entity mentioned above is used, the configuration information may be received from the management entity and thus obtained indirectly from the network exposure node. If the management entity mentioned above is not used, the LwM2M server may send, to the network exposure node, configuration information for NIDD between the LwM2M client and the LwM2M server, and receive, from the network exposure node, the configuration ID for the configuration information. In this case, the configuration information may be obtained directly from the network exposure node.

Figure 16B:
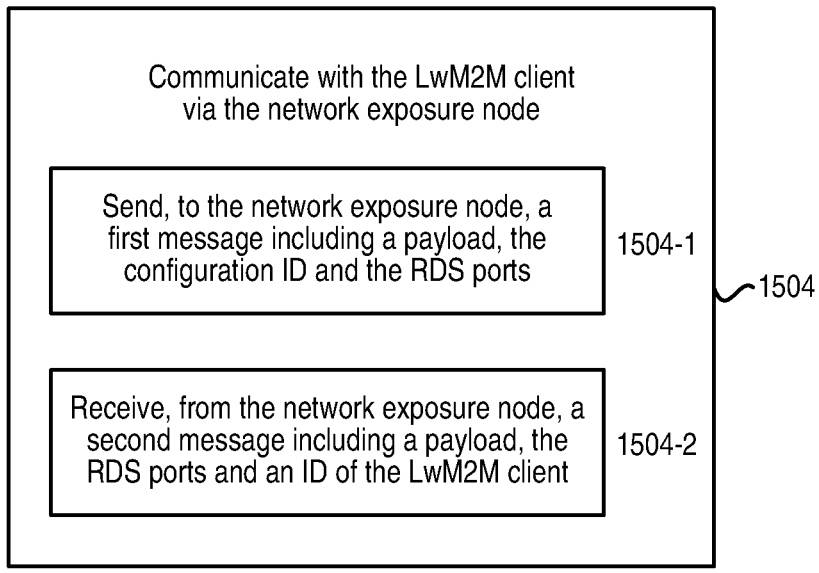

At block 1504, the LwM2M server communicates with the LwM2M client via the network exposure node. As shown in FIG. 16B, block 1504 may include block 1504-1 and/or block 1504-2. At block 1504-1, the LwM2M server sends, to the network exposure node, a first message including a payload, the configuration ID, the RDS ports of the network exposure node and the LwM2M client which correspond to the LwM2M server. As described above for the MT case, examples of the first message may include, but not limited to, a Bootstrap-Operation message, an Ack message, a Write message, a Read message, an Execute message, a Create message, and a Delete message. Optionally, the Bootstrap-Operation message may include the extended 'LwM2M Security' object as described above.

At block 1504-2, the LwM2M server receives, from the network exposure node, a second message including a payload, the RDS ports of the LwM2M client and the network exposure node which correspond to the LwM2M server, and an ID of the LwM2M client. As described above for the MO case, examples of the second message may include, but not limited to, a Bootstrap-Request message, a Bootstrap-Finish message, a Register message, and an Ack message.

Figure 17:
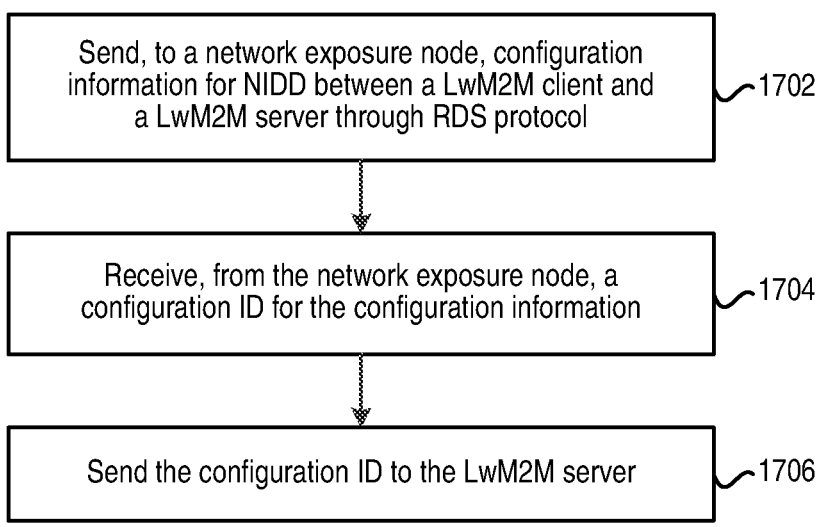
FIG. 17 is a flowchart illustrating a method implemented at a management entity according to an embodiment of the disclosure.

FIG. 17 is a flowchart illustrating a method implemented at a management entity according to an embodiment of the disclosure. At block 1702, the management entity sends, to a network exposure node, configuration information for NIDD between a LwM2M client and a LwM2M server through RDS protocol. For example, the configuration information may comprises: an ID (e.g. an external ID) of the LwM2M client; an ID (e.g. an SCS/AS ID) of the LwM2M server; a RDS port of the network exposure node (e.g. a RDS SCEF port) corresponding to the LwM2M server; a RDS port of the LwM2M client (e.g. a RDS UE port) corresponding to the LwM2M server; and a network address (e.g. a URL) of the LwM2M server. At block 1704, the management entity receives, from the network exposure node, a configuration ID for the configuration information. At block 1706, the management entity sends the configuration ID to the LwM2M server.

Figure 18A:
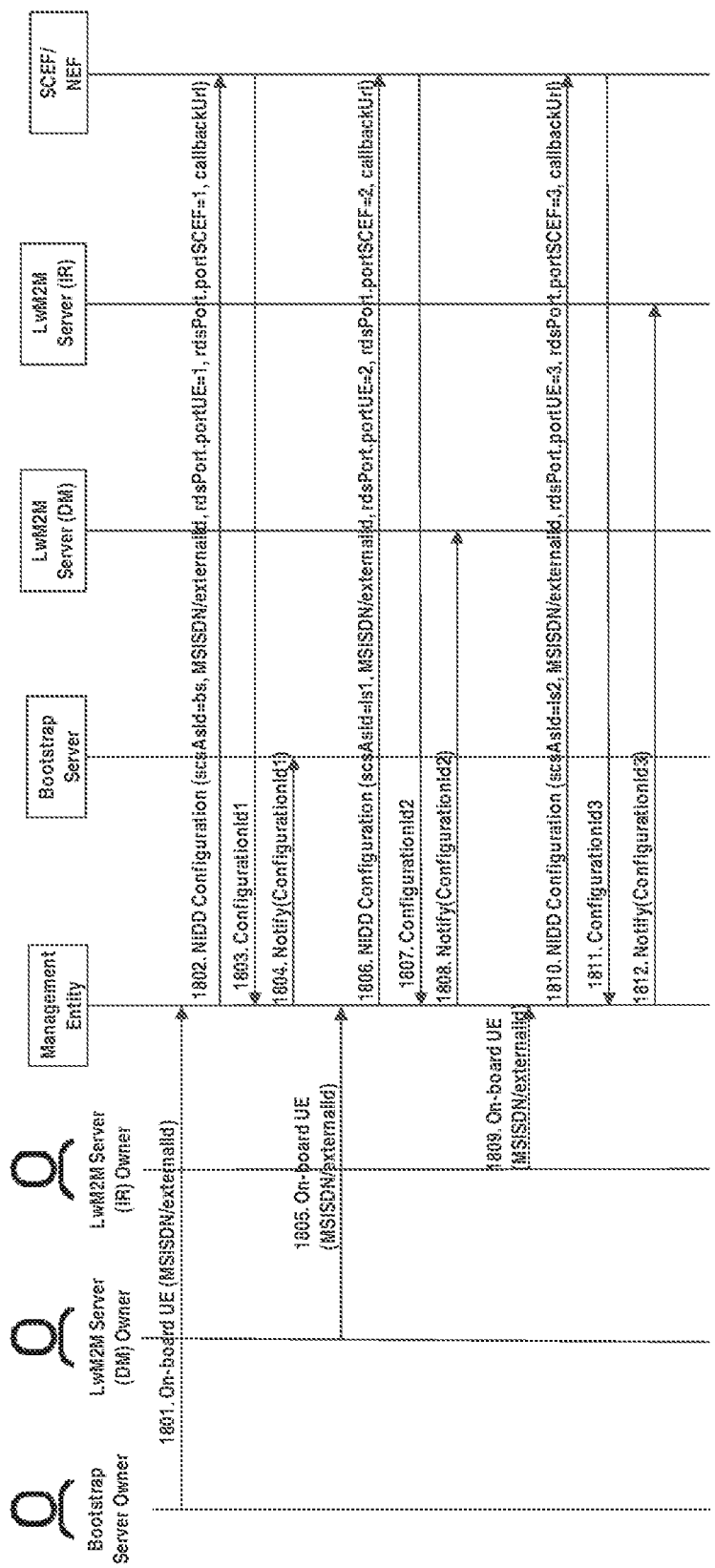
FIGS. 18A-18B are flowcharts illustrating an exemplary process according to an embodiment of the disclosure.
Figure 18B:
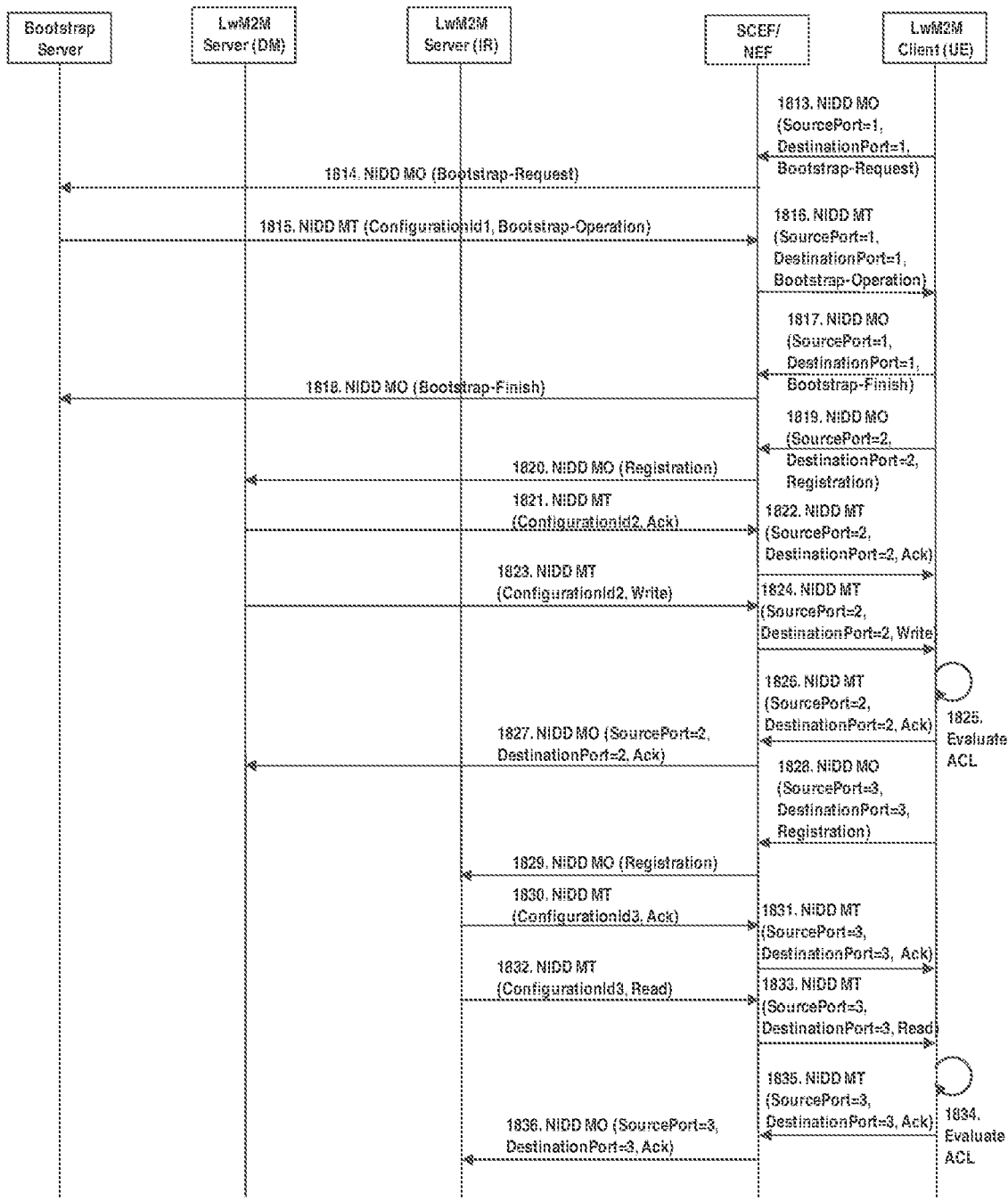

FIGS. 18A-18B are flowcharts illustrating an exemplary process according to an embodiment of the disclosure. In this exemplary example, device on-boarding, bootstrapping, registration, device management and information reporting are performed. During the device on-boarding for a LwM2M client, a management entity is used. In addition, three LwM2M Servers (a bootstrap server, a DM server and an IR server) and an SCEF/NEF are involved. During the subsequent process, the three LwM2M Servers, the SCEF/NEF and the LwM2M client are involved. Note that any other operations and/or more or less LwM2M servers may be used depending on the specific application scenario.

At block 1801, the Bootstrap Server Owner on-boards the device using the Management Function. At block 1802, the Management Function initiates NIDD Configuration towards the SCEF/NEF on behalf of the Bootstrap Server. The configuration consists of scsAsId, MSISDN/externalId, rdsPorts and callbackUrl. At block 1803, the SCEF/NEF returns ConfigurationId1. At block 1804, the Management Function notifies ConfigurationId1 to the Bootstrap Server.

At block 1805, the LwM2M Server (DM) Owner on-boards the same device using the Management Function. At block 1806, the Management Function initiates NIDD Configuration towards the SCEF/NEF on behalf of the LwM2M Server (DM). The configuration consists of scsAsId, MSISDN/externalId, rdsPorts and callbackUrl. At block 1807, the SCEF/NEF returns ConfigurationId2. At block 1808, the Management Function notifies ConfigurationId2 to the LwM2M Server (DM).

At block 1809, the LwM2M Server (IR) Owner on-boards the same device using the Management Function. At block 1810, the Management Function initiates NIDD Configuration towards the SCEF/NEF on behalf of the LwM2M Server (IR). The configuration consists of scsAsId, MSISDN/externalId, rdsPorts and callbackUrl. At block 1811, the SCEF/NEF returns ConfigurationId3. At block 1812, the Management Function notifies ConfigurationId3 to the LwM2M Server (IR).

At block 1813, the LwM2M Client sends Bootstrap-Request message over NIDD MO to the Bootstrap Server by specifying Source Port, Destination Port and payload. At block 1814, the SCEF/NEF routes the Bootstrap-Request message to the Bootstrap Server. At block 1815, the Bootstrap Server sends Bootstrap-Operation message over NIDD MT to the SCEF using ConfigurationId1. Optionally, the message may update 'LwM2M Security' object and 'LwM2M Server' object for other LwM2M Servers (e.g. the DM server and the IR server). The RDS UE ports may be configured through this bootstrapping procedure. At block 1816, the SCEF delivers the Bootstrap-Operation message to the LwM2M Client. The message includes Source Port, Destination Port and payload. At block 1817, the LwM2M Client sends Bootstrap-Finish message over NIDD MO to the Bootstrap Server by specifying Source Port, Destination Port and payload. At block 1818, the SCEF/NEF routes the Bootstrap-Finish message to the Bootstrap Server.

At block 1819, the LwM2M Client sends Register message over NIDD MO to the LwM2M Server (DM) by specifying Source Port, Destination Port and payload. At block 1820, the SCEF/NEF routes the Register message to the LwM2M Server (DM). At block 1821, the LwM2M Server (DM) sends Ack message over NIDD MT to the SCEF using ConfigurationId2. At block 1822, the SCEF delivers the Ack message to the LwM2M Client. The message includes Source Port, Destination Port and payload. At block 1823, the LwM2M Server (DM) sends Write message over NIDD MT to the SCEF using ConfigurationId2. At block 1824, the SCEF delivers the Write message to the LwM2M Client. The message includes Source Port, Destination Port and payload.

At block 1825, when the LwM2M Client receives the operation message from the LwM2M Server, the LwM2M Client may get the Source Port from the message and use the Source Port to look up the LwM2M Short Server ID (SSID) by accessing the 'LwM2M Security' and 'LwM2M Server' objects. Specifically, the LwM2M Client may look up 'LwM2M Security' object instances to see which instance contains this SCEF Port. Then, the LwM2M Client may get the same instance of 'LwM2M Server' object and get the SSID of the LwM2M Server. Then the LwM2M Client may evaluate the ACL rules to check if this LwM2M Server has the permission to manipulate the target object in the LwM2M client. At block 1826, the LwM2M Client sends Ack message over NIDD MO to the LwM2M Server (DM) by specifying Source Port, Destination Port and payload. At block 1827, SCEF/NEF routes the Ack message to LwM2M Server (DM).

At block 1828, the LwM2M Client sends Register message over NIDD MO to the LwM2M Server (IR) by specifying Source Port, Destination Port and payload. At block 1829, the SCEF/NEF routes the Register message to the LwM2M Server (IR). At block 1830, the LwM2M Server (IR) sends Ack message over NIDD MT to the SCEF using ConfigurationId3. At block 1831, the SCEF delivers the Ack message to the LwM2M Client. The message includes Source Port, Destination Port and payload. At block 1832, the LwM2M Server (IR) sends Write message over NIDD MT to the SCEF using ConfigurationId3. At block 1833, the SCEF delivers the Write message to the LwM2M Client. The message includes Source Port, Destination Port and payload.

At block 1834, the LwM2M Client may use the Source Port to look up the LwM2M SSID by accessing the 'LwM2M Security' and 'LwM2M Server' objects. Then the LwM2M Client may evaluate the ACL rules to check if this LwM2M Server has the permission to manipulate the target object in the LwM2M Client. At block 1835, the LwM2M Client sends Ack message over NIDD MO to the LwM2M Server (IR) by specifying Source Port, Destination Port and payload. At block 1836, the SCEF/NEF routes the Ack message to the LwM2M Server (IR). It should be noted that two blocks shown in succession in the figures may, in fact, be executed substantially concurrently, or the blocks may sometimes be executed in the reverse order, depending upon the functionality involved.

Figure 19:
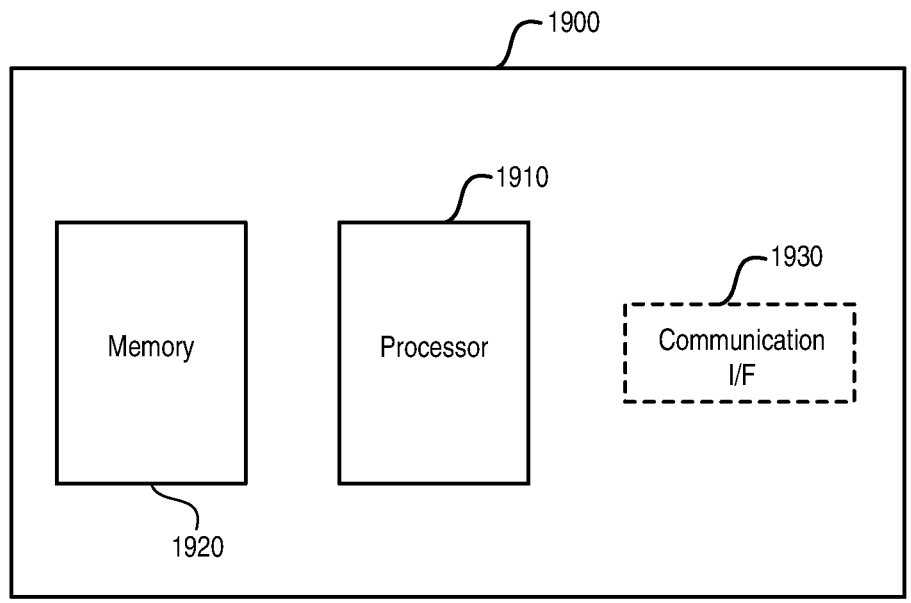
FIG. 19 is a block diagram showing an apparatus suitable for use in practicing some embodiments of the disclosure.

FIG. 19 is a block diagram showing an apparatus suitable for use in practicing some embodiments of the disclosure. For example, any one of the network exposure node, the LwM2M client, the LwM2M server and the management entity described above may be implemented through the apparatus 1900. As shown, the apparatus 1900 may include a processor 1910, a memory 1920 that stores a program, and optionally a communication interface 1930 for communicating data with other external devices through wired and/or wireless communication.

The program includes program instructions that, when executed by the processor 1910, enable the apparatus 1900 to operate in accordance with the embodiments of the present disclosure, as discussed above. That is, the embodiments of the present disclosure may be implemented at least in part by computer software executable by the processor 1910, or by hardware, or by a combination of software and hardware.

The memory 1920 may be of any type suitable to the local technical environment and may be implemented using any suitable data storage technology, such as semiconductor based memory devices, flash memories, magnetic memory devices and systems, optical memory devices and systems, fixed memories and removable memories. The processor 1910 may be of any type suitable to the local technical environment, and may include one or more of general purpose computers, special purpose computers, microprocessors, digital signal processors (DSPs) and processors based on multi-core processor architectures, as non-limiting examples.

Figure 20:
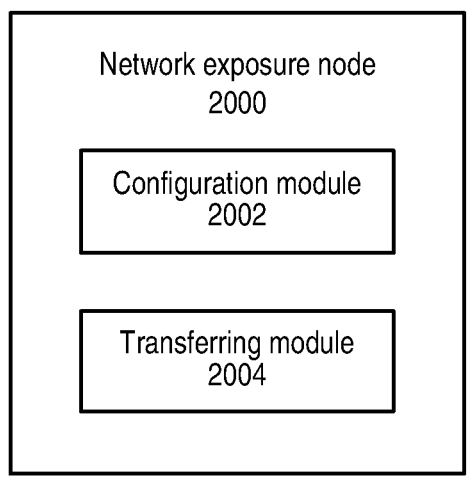
FIG. 20 is a block diagram showing a network exposure node according to an embodiment of the disclosure.

FIG. 20 is a block diagram showing a network exposure node according to an embodiment of the disclosure. As shown, the network exposure node 2000 comprises a configuration module 2002 and a transferring module 2004. The configuration module 2002 may be configured to perform configuration such that the network exposure node can transfer traffic between a LwM2M client and at least one LwM2M server over NIDD through RDS protocol, as described above with respect to block 702. The transferring module 2004 may be configured to transfer traffic between the LwM2M client and the at least one LwM2M server based on the configuration, as described above with respect to block 704.

Figure 21:
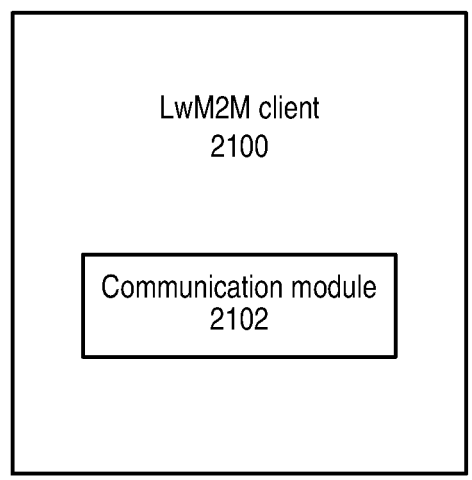
FIG. 21 is a block diagram showing a LwM2M client according to an embodiment of the disclosure.

FIG. 21 is a block diagram showing a LwM2M client according to an embodiment of the disclosure. As shown, the LwM2M client 2100 comprises a communication module 2102 configured to communicate with at least one LwM2M server over NIDD via a network exposure node through RDS protocol, as described above with respect to block 1202.

Figure 22:
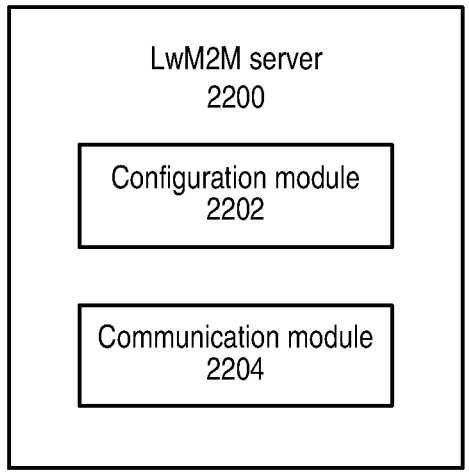
FIG. 22 is a block diagram showing a LwM2M server according to an embodiment of the disclosure.

FIG. 22 is a block diagram showing a LwM2M server according to an embodiment of the disclosure. As shown, the LwM2M server 2200 comprises a configuration module 2202 and a communication module 2204. The configuration module 2202 may be configured to perform configuration such that the LwM2M server can communicate with a LwM2M client via a network exposure node over NIDD through RDS protocol, as described above with respect to block 1502. The communication module 2204 may be configured to communicate with the LwM2M client via the network exposure node, as described above with respect to block 1504.

Figure 23:
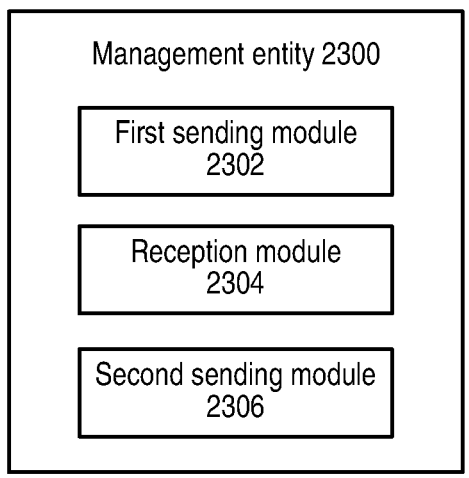
FIG. 23 is a block diagram showing a management entity according to an embodiment of the disclosure.

FIG. 23 is a block diagram showing a management entity according to an embodiment of the disclosure. As shown, the management entity 2300 comprises a first sending module 2302, a reception module 2304 and a second sending module 2306. The first sending module 2302 may be configured to send, to a network exposure node, configuration information for NIDD between a LwM2M client and a LwM2M server through RDS protocol, as described above with respect to block 1702. The reception module 2304 may be configured to receive, from the network exposure node, a configuration ID for the configuration information, as described above with respect to block 1704. The second sending module 2306 may be configured to send the configuration ID to the LwM2M server, as described above with respect to block 1706. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a network exposure node comprising:
   performing configuration by the network exposure node such that the network exposure node can transfer traffic between a lightweight machine to machine, LwM2M, client and an LwM2M server over non-Internet protocol data delivery, NIDD, through reliable data service, RDS, protocol;
   performing the configuration by the network exposure node comprising receiving configuration information for the NIDD between the LwM2M client and the LwM2M server, and providing, to the LwM2M server, a configuration identifier, ID, for the configuration information; and
   transferring traffic between the LwM2M client and the LwM2M server based on the configuration.

2. The method according to claim 1, wherein the configuration causes:
   at least one RDS port of the network exposure node each of which corresponds to the LwM2M server; and
   at least one RDS port of the LwM2M client each of which corresponds to the LwM2M server.

3. The method according to claim 2, wherein the LwM2M server comprises a bootstrap server; and
   wherein both the RDS port of the network exposure node and the RDS port of the LwM2M client which correspond to the bootstrap server are predefined RDS ports.

4. The method according to claim 1, wherein the configuration has the configuration ID and the configuration information; and
   wherein the configuration information comprises:
      an ID of the LwM2M client;
      an ID of the LwM2M server;
      a RDS port of the network exposure node corresponding to the LwM2M server;
      a RDS port of the LwM2M client corresponding to the LwM2M server; and
      a network address of the LwM2M server.

5. The method according to claim 1, wherein the LwM2M server comprises one or more of: a bootstrap server, a device management server and an information reporting server.

6. The method according to claim 1, wherein transferring traffic between the LwM2M client and a LwM2M server comprises:
   receiving, from the LwM2M server, a first message including a payload, the configuration ID corresponding to the LwM2M client, the RDS ports of the network exposure node and the LwM2M client which correspond to the LwM2M server;
   determining an ID of the LwM2M client from the configuration information corresponding to the configuration ID; and
   sending a second message to the LwM2M client based on the ID of the LwM2M client, the second message including the payload, the RDS ports of the network exposure node and the LwM2M client which correspond to the LwM2M server.

7. The method according to claim 1, wherein transferring traffic between the LwM2M client and a LwM2M server comprises:
   receiving, from the LwM2M client, a third message including a payload, the RDS ports of the LwM2M client and the network exposure node which correspond to the LwM2M server, and an ID of the LwM2M client;
   determining a network address of the LwM2M server from the configuration information corresponding to the RDS ports of the LwM2M client and the network exposure node and the ID of the LwM2M client; and
   sending a fourth message to the LwM2M server based on the network address of the LwM2M server, the fourth message including the payload, the RDS ports of the LwM2M client and the network exposure node, and the ID of the LwM2M client.

8. A method in a lightweight machine to machine, LwM2M, client comprising:
   receiving configuration information, from a network exposure node, for non-Internet protocol data delivery, NIDD, between an LwM2M client and an LwM2M server, and providing, to the LwM2M server, a configuration identifier, ID, for the configuration information; and
   communicating with the LwM2M server over the NIDD, using the configuration information, via the network exposure node through reliable data service, RDS, protocol.

9. The method according to claim 8, wherein the communication is performed based on:
   at least one RDS port of the network exposure node each of which corresponds to the LwM2M server; and
   at least one RDS port of the LwM2M client each of which corresponds the LwM2M server.

10. The method according to claim 9, wherein the LwM2M server comprises a bootstrap server; and
    wherein both the RDS port of the network exposure node and the RDS port of the LwM2M client which correspond to the bootstrap server are predefined RDS ports.

11. The method according to claim 9, wherein communicating with a LwM2M server comprises:
    receiving, from the network exposure node, a first message including a payload, the RDS ports of the network exposure node and the LwM2M client which correspond to the LwM2M server.

12. The method according to claim 9, wherein communicating with a LwM2M server comprises:

sending, to the network exposure node, a second message including a payload, the RDS ports of the network exposure node and the LwM2M client which correspond to the LwM2M server, and an ID of the LwM2M client.

13. The method according to claim 9, wherein the LwM2M server comprises a device management server or an information reporting server; and wherein the RDS port of the LwM2M client corresponding to the device management server or the information reporting server is a predefined RDS port or is configured by a bootstrap server.

14. The method according to claim 13, wherein the RDS port of the LwM2M client corresponding to the device management server or the information reporting server is configured by the bootstrap server through a 'LwM2M Security' object which includes an instance containing a RDS port of the LwM2M client corresponding to the device management server or the information reporting server.

15. The method according to claim 8, wherein the LwM2M client has a 'LwM2M Security' object and a 'LwM2M Server' object each of which is preconfigured or obtained from outside;

wherein the 'LwM2M Security' object includes, for the LwM2M server, an instance containing a RDS port of the network exposure node corresponding to the LwM2M server; and wherein the 'LwM2M Server' object includes, for the LwM2M server, an instance containing information related to the LwM2M server.

16. The method according to claim 15, wherein the first message is an instruction for performing an operation on the LwM2M client; and wherein the method further comprises:
determining an identifier, ID, of the LwM2M server based on the RDS port of the network exposure node corresponding to the LwM2M server, the 'LwM2M Security' object and the 'LwM2M Server' object; and determining whether the LwM2M server is permitted to perform the operation, based on the ID of the LwM2M server and an access control list, ACL.

17. The method according to claim 16, wherein determining the ID of the LwM2M server comprises:

determining, from the 'LwM2M Security' object, an instance ID of an instance containing the RDS port of the network exposure node corresponding to the LwM2M server; and determining the ID of the LwM2M server from an instance having the same instance ID in the 'LwM2M Server' object.

18. A network exposure node comprising:
at least one processor; and
at least one memory, the at least one memory containing instructions executable by the at least one processor, whereby the network exposure node is operative to:
perform configuration by the network exposure node such that the network exposure node can transfer traffic between a lightweight machine to machine, LwM2M, client and an LwM2M server over non-Internet protocol data delivery, NIDD, through reliable data service, RDS, protocol;
performing the configuration by the network exposure node comprising receiving configuration information for the NIDD between the LwM2M client and the LwM2M server, and providing, to the LwM2M server, a configuration identifier, ID, for the configuration information; and
transfer traffic between the LwM2M client and the LwM2M server based on the configuration.

19. The network exposure node according to claim 18, wherein the configuration is operative to cause:
at least one RDS port of the network exposure node each of which corresponds to the LwM2M server; and
at least one RDS port of the LwM2M client each of which corresponds to one or more of the LwM2M server.

* * * * *